United States Patent
Bish et al.

(10) Patent No.: US 8,037,361 B2
(45) Date of Patent: Oct. 11, 2011

(54) SELECTIVE WRITE PROTECT FOR DISASTER RECOVERY TESTING

(75) Inventors: Thomas W. Bish, Tucson, AZ (US); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 12/612,077

(22) Filed: Nov. 4, 2009

(65) Prior Publication Data
US 2011/0107140 A1    May 5, 2011

(51) Int. Cl.
G06F 11/00    (2006.01)
(52) U.S. Cl. .................. 714/41; 707/999.204
(58) Field of Classification Search ............ 714/41
See application file for complete search history.

(56) References Cited

U.S. PATENT DOCUMENTS

| | | | |
|---|---|---|---|
| 6,052,797 A | 4/2000 | Ofek et al. | |
| 6,442,709 B1 | 8/2002 | Beal et al. | |
| 6,732,294 B2 * | 5/2004 | Mackrory et al. | 714/25 |
| 6,744,595 B2 | 6/2004 | Blair et al. | |
| 7,139,885 B2 | 11/2006 | Yamagami | |
| 7,222,140 B2 | 5/2007 | Fisher et al. | |
| 7,302,540 B1 | 11/2007 | Holdman et al. | |
| 7,770,058 B2 * | 8/2010 | Phan | 714/6.12 |
| 2003/0126389 A1 | 7/2003 | Mackrory et al. | |
| 2005/0039069 A1 | 2/2005 | Prahlad et al. | |
| 2006/0075148 A1 * | 4/2006 | Osaki | 710/5 |
| 2006/0085792 A1 | 4/2006 | Traut | |
| 2008/0250214 A1 | 10/2008 | Brettell et al. | |
| 2008/0263079 A1 | 10/2008 | Soneji et al. | |

FOREIGN PATENT DOCUMENTS

EP    1669872 A2    6/2006
EP    1755027 A1    2/2007

OTHER PUBLICATIONS

International Search Report for counterpart application No. PCT/EP2010/062758, dated Dec. 17, 2010.

* cited by examiner

*Primary Examiner* — Michael C Maskulinski
(74) *Attorney, Agent, or Firm* — Griffiths & Seaton PLLC

(57) ABSTRACT

Various method, system, and computer program product embodiments for implementing selective write-protect by a processor in a data storage system within a plurality of redundant storage systems for disaster recovery testing are provided. In one such embodiment, a write-protect state is initiated within at least one of the plurality of redundant storage systems. An available plurality of categories, including at least one write-protect exclusion category, is configured within a management interface of the data storage system, such that during the disaster recovery testing a storage volume categorized in the write-protect exclusion category is excluded from write protection.

20 Claims, 4 Drawing Sheets

US 8,037,361 B2

SELECTIVE WRITE PROTECT FOR DISASTER RECOVERY TESTING

BACKGROUND OF THE INVENTION

1. Field of the Invention

The present invention relates in general to computers, and more particularly to apparatus, method and computer program product embodiments for implementing selective write protection mechanisms for disaster recovery testing in a computing storage environment.

2. Description of the Related Art

As larger and more complex disaster recoverable data storage systems become reality, there is introduced a greater need for the user to be able to test their data centers' recoverability. Testing the recoverability of an installation allows the user to validate that its personnel, its information technology (IT) infrastructure, the host software and the storage product itself can handle an unexpected disaster.

A number of storage system installations may be subdivided into two segments. A first segment may be referred to as the production location, having production hosts connected to storage system hardware. The second segment may be referred to as the disaster recovery (DR) location, which is usually at remote distances from the production location. Data written to the production components of the installation may be then replicated to the DR location, thus providing a secondary copy of the data in the event the production location is lost.

In the event the production location is lost, users must recover all production responsibilities at the DR location. This may be accomplished by maintenance of a set of available backup hosts, which are connected to the DR location storage system hardware, and simply not utilized. In order to utilize these backup hosts for production, the production host environment/configuration is constantly mirrored to the DR location. This mirrored image can be restored into a backup host, which can then be used to continue production processing to the DR storage system hardware in the event the production location or locations are lost.

Since the process of restoring a host image and continuing production from a DR location is not trivial, it is beneficial and desirable by users to simulate disasters and test the configuration's recoverability so that events may smoothly transpire in the event of a real disaster.

SUMMARY OF THE INVENTION

A variety of constraints may present themselves to users wishing to apply DR testing to computing storage resources. In one example, it may be desirable for the production system to continue to run simultaneously while the DR system is tested, so as not to impede the production system and overall data flow. Current approaches to address such constraints, however, are insufficient to maintain protection for data that must be write-protected, yet allow flexibility for other data to be fully accessed. A need exists for a mechanism whereby various kinds of data in the computing storage environment maintain a selected level of write protection while other kinds of data are excluded from such protection without the excessive consumption of computing resources or time expended by the user.

In view of the foregoing, various method, system, and computer program product embodiments for implementing selective write-protect by a processor in a data storage system within a plurality of redundant storage systems for disaster recovery testing are provided. In one such embodiment, by way of example only, a write-protect state is initiated within at least one of the plurality of redundant storage systems. An available plurality of categories, including at least one write-protect exclusion category, are configured within a management interface of the data storage system, such that during the disaster recovery testing a storage volume categorized in the write-protect exclusion category is excluded from write protection.

In addition to the foregoing exemplary embodiment, various other method, system, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
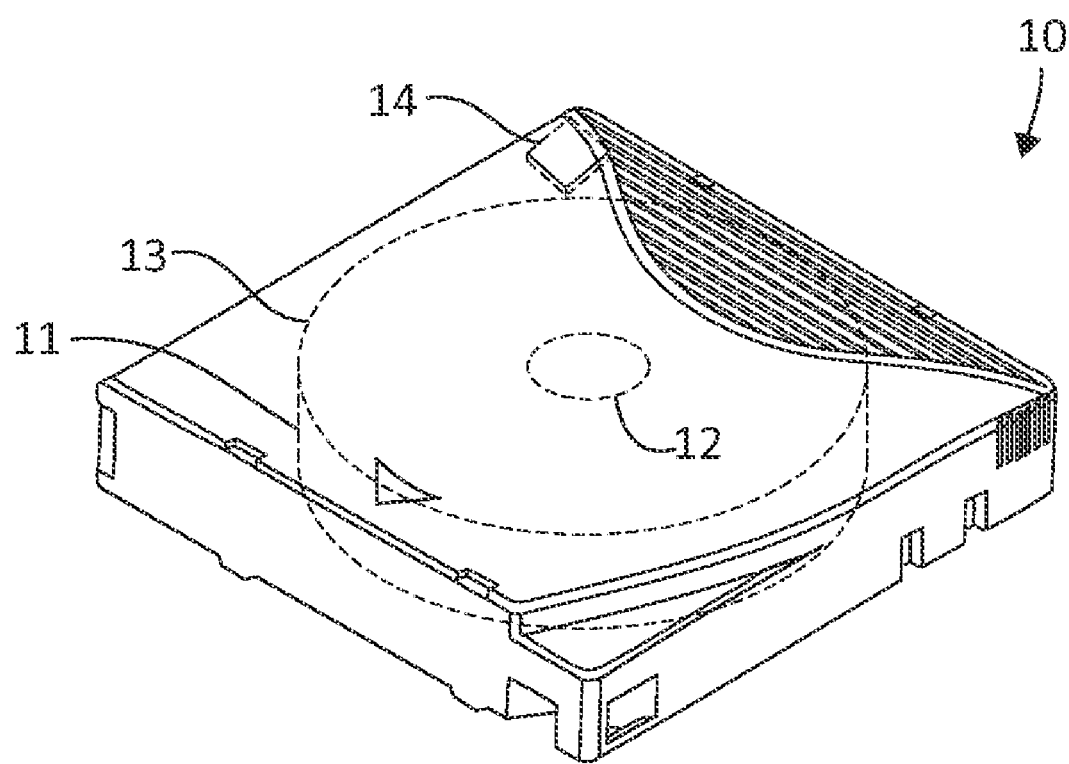
FIG. 1 is an isometric view of a removable data storage cartridge with a media, such as magnetic tape, and with a cartridge memory shown in phantom.

Referring to FIG. 1, an example of a data storage cartridge 10, such as a magnetic tape cartridge, is illustrated which comprises a rewritable magnetic tape 11 wound on a hub 12 of reel 13, and a cartridge memory 14. One example of a magnetic tape cartridge comprises a cartridge based on LTO (Linear Tape Open) technology. The cartridge memory (CM) 14, for example, comprises a transponder having a contactless interface, which is retained in the cartridge 10, for example, by being encapsulated by the cartridge when it is assembled, as is understood by those of ordinary skill in the art. The illustrated magnetic tape cartridge is a single reel cartridge. Magnetic tape cartridges may also comprise dual reel cartridges in which the tape is fed between reels of the cartridge. The magnetic tape 11 is typically arranged to store a large number of volumes of data.

Data is not always stored on a physical media 11 whose replacement in a physical cartridge 10 can be detected. Rather, data storage systems may store data in different forms, such as logical or virtual data, and an example of such a system is illustrated in the data storage system 20 of FIG. 2. Herein, data may be organized in any of various forms, called "volumes" or "objects", the terms chosen without reference to any particular size or arrangement of data.

Figure 2:
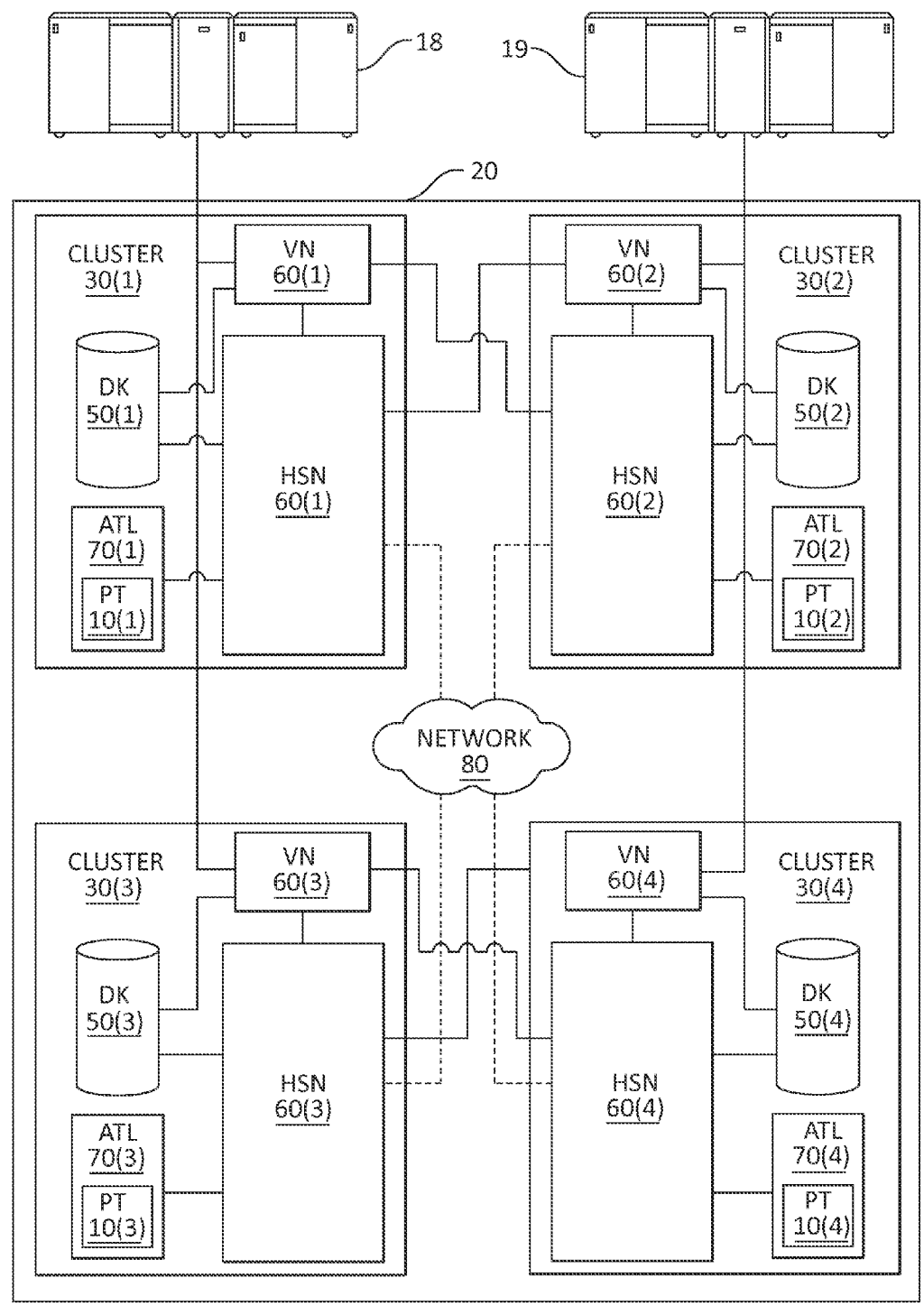
FIG. 2 is a diagrammatic illustration of a data storage system which may implement the present invention.
Figure 3:
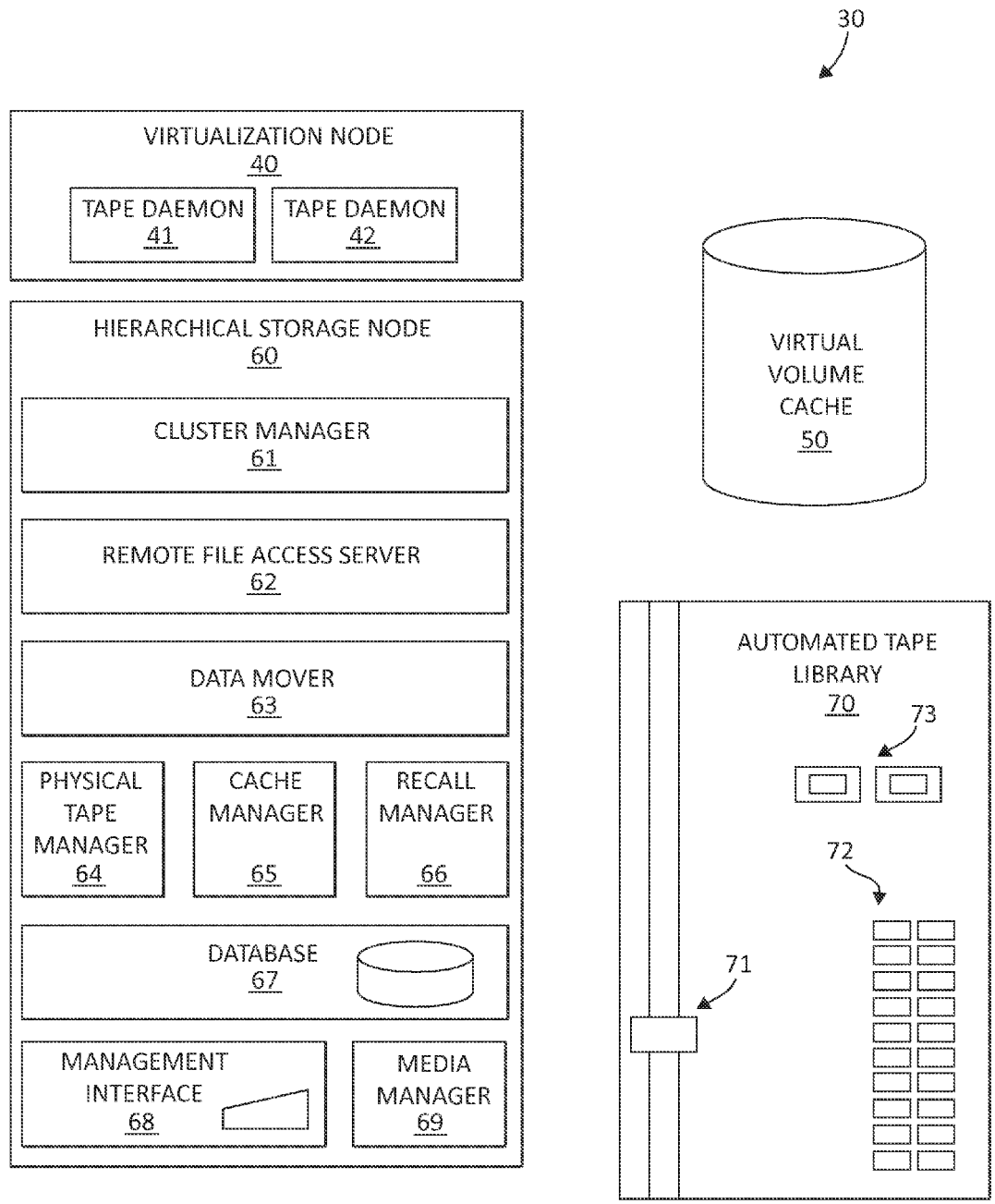
FIG. 3 is a diagrammatic illustration of a server of the data storage system of FIG. 2.

Referring to FIGS. 2 and 3, the data storage system 20 provides storage for a plurality of host systems 18, 19. The data storage system 20, in one embodiment, employs four (4) virtual tape server clusters 30 interconnected by a network 80 with each cluster 30 including a virtualization node ("VN") 40 and a disk storage ("DK") 50 for emulating a tape drive or tape library to hosts 18, 19. Each cluster further comprises a hierarchical storage node ("HSN") 60 for locally moving data between disk storage 50 and an automated tape library ("ATL") 70 as well as remotely moving data between a local disk storage 50 and a remote disk storage. Examples of disk storage comprise one or more disk drives, for example, arranged as a redundant array of independent disks (RAID) or just a bunch of disks (JBOD), or solid state disk (SSD), etc. Herein, a data storage system having both disk storage 50 and an automated tape library 70 is called a "composite library."

In one embodiment, disk storage 50 serves as a virtual volume cache containing logical volumes that emulate data volumes that would be stored on magnetic tape 11 of FIG. 1. Still referring to FIGS. 2 and 3, the logical volumes are stored by disk storage 50 for local and remote access thereto, and library 70 comprises at least one robotic accessor 72 for mounting physical tape cartridges 10 in physical tape drives 73 for access to volumes stored in the physical tape cartridges 10. To this end, virtualization node 40 employs a pair of tape daemons 40 and 41 for operating on virtual volume files residing in either local cache disk storage 50 or a remote cache disk storage as directed by a host system 18, 19, and hierarchical storage node 60 employs a cluster manager 61, a remote file access server 62, a data mover 63, a physical tape manager 64, a cache manager 65, a recall manager 66, a database 67, a management interface 68 and a media manager 69.

Cluster manager 61 coordinates operations between clusters 30 via intercluster tokens that are stored in each cluster's database 67 to determine which cluster 30 has a current copy of data and coordinates copying of data between clusters. Remote file access server 62 provides a link to cache disk storage 50 by a remote cluster. Data mover 63 controls the actual data transfer operations for copies performed between clusters 30 and transfers of data between cache disk storage 50 and library 70.

Physical tape manager 64 manages physical tape volumes in library 70 in multiple physical volume pools, controls reclamation, borrows/returns volumes from a scratch pool, and controls movement of physical tape cartridges 10 and the volumes between pools. Cache manager 65 controls a copying of data volumes between cache disk storage 50 to library 70 and any subsequent removal of a redundant copy of data in cache 50, and provides control signals to balance data flow between cache disk storage 50 and other node 60 components. Recall manager 66 queues and controls recalls of data into cache data storage 50 from library 70 on behalf of virtualization node 40 and cluster manager 61.

Management interface 68 provides information about virtual tape server cluster 30 and may allow a user control and configuration of cluster 30. Media manager 69 manages the handling of physical tape cartridges 10 and error recovery, and diagnoses errors and determines if the errors were caused by a physical tape drive 73 of library 70 or a physical tape media 11 to thereby take appropriate action. An example of a data storage system 20 which may implement the present invention comprises the IBM® TS7700 Virtual Tape Server, which may provide disaster recoverable virtual tape storage functionality to users. As one of ordinary skill in the art will appreciate, various configurations of the TS7700 system and other such data storage systems may be implemented to perform such recoverable functionality. In one example, TS7700 hardware may be co-located at both the production and the DR sites.

As was mentioned previously, since the process of restoring a host image and continuing production from a DR location is not trivial, it is beneficial and desirable by users to simulate disasters and test the configuration's recoverability so that events may smoothly transpire in the event of a real disaster. A variety of constraints, again as previously described, tend to surface for users that perform and execute DR test scenarios on computing storage equipment. One of these constraints is that the production system should be able to continue to run simultaneously to running their DR test scenario. In other words, the user may be constrained from letting the production host and accompanying production jobs pause for a DR testing scenario that may take several days to fully execute.

An additional constraint may be that the DR host environment should not be able to modify any production-generated content. Alternatively, the DR host environment should only be allowed to read the production related content for validation purposes. This scenario implies a read-only concept, except the DR host must itself create data in order to process its test. This means only production data should be write-protected, while the DR host data should continue to receive full access, such as access to both reads and writes. Finally, the production environment may return certain data volumes to a scratch pool (a pool of volumes to be reused in a different capacity, such as by a differing owning application) as the production host environment determines the content is no longer valid. Since the DR host test is likely using a snapshot of the production host environment before the production system scratched the volume, the DR host should be able to continue to view the volumes as private with full read access, even though the production host has since moved it into a scratch pool.

Current methodologies to address the above constraints generally move the entire DR cluster of storage hardware and/or the host environment into a read-only state. This prevents the DR host from inadvertently modifying production data. However, since the DR host must create data itself, it must also be attached to a completely independent storage solution that allows writes. As a result, the DR host cannot use just the storage hardware in the DR location, but must instead have additional storage hardware present to absorb the DR host write/modify jobs.

In addition to the foregoing, the DR host's ability to access production data that has since been scratched (pursuant to placement in a scratch pool) may be complicated by a variety of factors. A volume may be viewed to be in scratch or to be private based on its currently assigned category. In the TS7700 storage implementation to illustrate an exemplary embodiment, category itself is a global property that is synchronized between all components. Therefore, if a production host modifies a category (return to scratch, for example), the DR location will be informed of this update. The category change itself is not as harmful as the Grid scope properties associated with the category. These extended properties are configured within the TS7700 (i.e. via management interface 68, FIG. 3) and allow the TS7700 to provide additional functions associated with volumes in scratch categories. For example, volumes that reside in scratch categories have faster mount times since the data associated with the volume is not needed and a volume stub is returned in its place. In addition, content associated with scratch categories can be automatically deleted after a grace period has expired. Last, data within scratch categories can be put into a 'hold' state, which prevents any host operation from accessing the data until a grace period has passed.

Overall, the simple act of returning a volume to scratch in the production system may impact the DR host setup. For example, the DR host may mount a volume it believes to be private, and instead get a volume stub. Alternatively, the data will be automatically deleted before the DR host has a chance to read/validate its contents. Finally, the volume may enter a hold state that prevents the DR host from accessing its contents. One current solution requires the user to disable the features causing the above-described issues. While this allows the DR host to continue testing, the user then may lose the benefits of those features in their production environment.

To address the issues described previously, the illustrated embodiments implement an extension to a "writeprotect" option that may be enabled at the DR location. This write-protect functionality extension operates to exclude certain predefined categories from write protection. Since the DR host will utilize its own scratch and private categories for data creation/modification, these categories can be excluded from the write protection while still allowing the production unique categories to be write protected. With this option in place, the DR host can complete the full DR test scenario using fewer resources. For example, in one embodiment incorporating TS7700 implementations, only one TS7700 may be required for testing purposes instead of two.

In addition to the foregoing, the illustrated embodiments provide for an option that is made available to further ignore all scratch category characteristics associated with write-protected categories. This allows the DR hardware to view the production scratch categories as private, and thus not execute or honor any of the scratch category properties. For example, a production scratch volume can be mounted as private and its actual content will be surfaced to the DR host versus a scratch volume stub. Alternatively, a volume won't be held or deleted at the DR host location.

In one embodiment, a new modification may be made to an existing management interface panel to implement the previously described selective write-protect functionality. For example, instead of simply implementing a Boolean-based write-protect property, a table of excluded categories may be added. The user can then add multiple-bit (e.g., 16 bit) hexadecimal categories to the table. Within each of these write protect exclusion categories, as will be herein termed, residing volumes are then viewed as authorized to read, write, update and have their properties modified by the DR host. Any volume that does not reside in this exclusion list is only allowed to be read by the DR host and is never written, modified or have its properties updated by the DR host.

An additional Boolean option may also added to exclude scratch (e.g., "fast-ready") category properties of categories 'NOT' in the exclusion list. This means volumes assigned categories in the exclusion list that also have a category that is configured as scratch will continue to honor the added functions provided by the storage system. However, those volumes that reside in categories designated as scratch and 'NOT' in the exclusion list will not have their scratch features honored. Instead, the storage system will view the category as private and allow full read access and not execute any background hold or deletion processing against the non-excluded volumes.

Only when the write-protect option is enabled will the exclusion categories and the ignore scratch category characteristics option be relevant. In other words, if a storage server, for example, is not in the write protect state, these additional properties are never accessed and therefore implicitly ignored. When the write-protect option is disabled via the management interface, all write-protection and scratch category overrides will no longer be honored and the DR location will immediately revert to a standard configuration, without any special read/write/update limitations.

Figure 4:
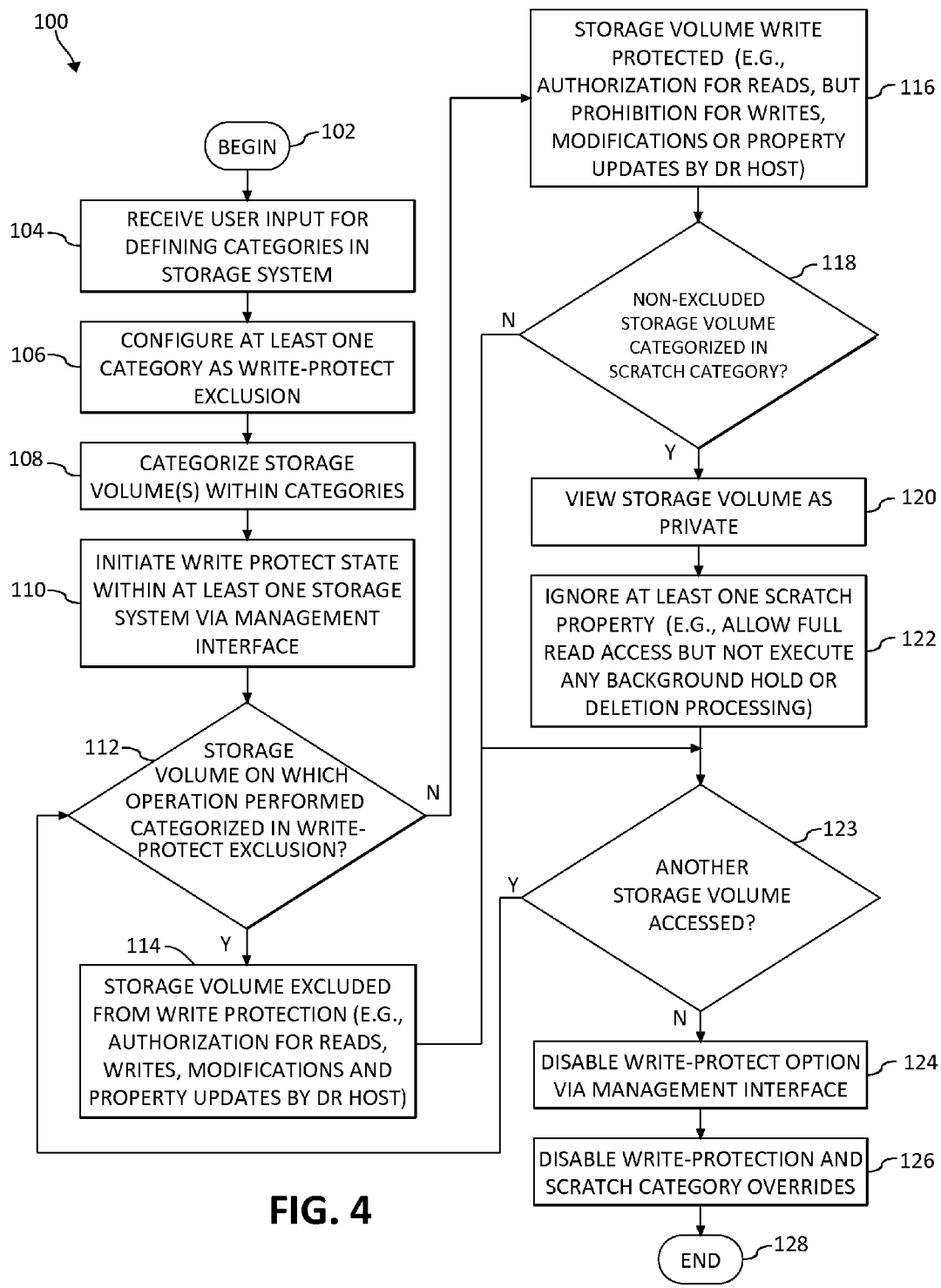
FIG. 4 is a flow chart diagram of an exemplary method for implementing selective write-protect by a processor in a data storage system within a plurality of redundant storage systems for disaster recovery testing.

Turning now to FIG. 4, a flow-chart diagram of a method 100 for implementing a write protect state in a computer data storage system, such as that previously described, is depicted.

As one of ordinary skill in the art will appreciate, various steps in the method 100 may be implemented in differing ways to suit a particular application. In addition, the described method may be implemented by various means, such as hardware, software, firmware, or a combination thereof operational on or otherwise associated with the computing storage environment. For example, the method 100 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 100 begins (step 102) with receipt of a user input for defining a number of categories in the storage system (e.g., TS7700 via the management interface) as previously described (step 104). At least one of the categories is designated as a write-protect exclusion category (step 106). As a following step, the system (with optional assistance from the user) may categorize various storage volumes within the various predefined categories, including the write-protect exclusion categories (step 108). In one exemplary embodiment, this occurs through a host tape management system, a component within the host that defines volume ranges to a host. The production and disaster recovery hosts may each assign categories to volumes under their control.

At a future time, the write protect state is initiated within at least one storage system via the management interface (step 110). For example, such initiation may occur pursuant to the commencement of DR testing or for another reason. Once the write protect state is initiated, the method 100 queries whether a particular storage volume to which an operation (e.g., read) is to be performed is categorized in the write-protect exclusion category (step 112). If so, the volume is excluded from write protection (step 114). This means, for example, that the storage volume retains authorization for all reads, writes, modifications, and property updates by the DR host pursuant to the DR testing. Step 114 then moves to step 123, which queries whether another storave volume has been accessed.

Returning to step 112, if the storage volume in question is determined to not be in the write-protect exclusion category, then the storage volume enters a write-protected state (step 116). In other words, the non-excluded storage volume retains authorization for all reads, but is prohibited from writes, modifications, or updates to properties by the DR host pursuant to DR testing. As a following step, the method 100 then queries to determine if the non-excluded storage volume is also categorized as scratch (step 118). If so, the non-excluded storage volume is viewed as private (step 120), and at least one scratch property of the non-excluded storage volume is ignored (step 122). In other words, the non-excluded storage volume continues to be write-protected, and the scratch properties of the volume are ignored. Ignoring example scratch properties may include, as previously described, not executing any background holds or deletion processing on the non-excuded, scratch volume. In one exemplary embodiment, the query performed in step 118 and subsequent action in steps 120 and 122 only occurs pursuant to such configuration by the system and/or the user. In other embodiments, this query and subsequent activity may or may not be included as an option.

If the non-excluded storage volume is not categorized as scratch, the method 100 then moves to step 123. As previously mentioned, step 123 queries whether another storage volume has been accessed. If this is the case, method 100 then returns to step 112 to determine if the additional accessed storage volume is categorized in the write-protect exclusion category, and steps 114-122 repeat as necessary. If however, another storage volume is not accessed, the method moves to step 124. At some point in time, the DR testing concludes, or for another reason, the write-protection functionality is disabled, for example via the management interface. Pursuant to this action, the previously enabled write-protection applied to the non-excluded volumes are disabled, as are any scratch category overrides (step 126). The method 100 then ends (step 128).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for implementing selective write-protect by a processor in a data storage system within a plurality of redundant storage systems for disaster recovery testing, comprising:

initiating a write-protect state within at least one of the plurality of redundant storage systems, wherein:
an available plurality of categories, including at least one write-protect exclusion category, is configured within a management interface of the data storage system, such that during the disaster recovery testing a storage volume categorized in the at least one write-protect exclusion category is excluded from write protection.

2. The method of claim 1, further wherein if another storage volume is categorized in at least one scratch category previously defined in the available plurality of categories, the another storage volume is viewed as private, and at least one scratch property of the another storage volume is ignored during the disaster recovery testing.

3. The method of claim 2, wherein ignoring the at least one scratch property includes ignoring a scratch mount shortcut path.

4. The method of claim 1, further including designating the at least one write-protect exclusion category with a multiple bit hexadecimal value.

5. The method of claim 1, wherein excluding the storage volume from write-protection during the disaster recovery testing includes allowing at least one of a read operation, write operation, update operation, and property modification to be performed by a disaster recovery host.

6. The method of claim 2, wherein ignoring the at least one scratch property of the another storage volume includes allowing full read access concurrently with non-execution of at least one of a background hold or deletion processing against the another storage volume.

7. A disaster recovery testing system for use in a data storage system within a plurality of redundant storage systems, comprising:
a management module, including a management interface, operational in the data storage system, wherein the management module is adapted for:
initiating a write-protect state within at least one of the plurality of redundant storage systems, wherein:
an available plurality of categories, including at least one write-protect exclusion category, is configured within the management interface, such that during disaster recovery testing a storage volume categorized in the at least one write-protect exclusion category is excluded from write protection.

8. The system of claim 7, wherein the management module is further adapted for, if another storage volume is categorized in at least one scratch category previously defined in the available plurality of categories, viewing the another storage volume as private, and ignoring at least one scratch property of the another storage volume during the disaster recovery testing.

9. The system of claim 8, wherein the management module is further adapted for, pursuant to ignoring the at least one scratch property, ignoring a scratch mount shortcut path.

10. The system of claim 7, wherein the management module is further adapted for designating the at least one write-protect exclusion category with a multiple bit hexadecimal value.

11. The system of claim 7, wherein the management module is further adapted for, pursuant to excluding the storage volume from write protection during the disaster recovery testing, allowing at least one of a read operation, write operation, update operation, and property modification to be performed by a disaster recovery host.

12. The system of claim 8, wherein the management module is further adapted for, pursuant to ignoring the at least one scratch property of the another storage volume, allowing full read access concurrently with non-execution of at least one of a background hold or deletion processing against the another storage volume.

13. The system of claim 7, wherein the data storage system includes at least one virtual tape server, and the management interface is utilized for control of at least one virtual tape device operational on the at least one virtual tape server.

14. A computer program product for implementing selective write-protect in a data storage system within a plurality of redundant storage systems for disaster recovery testing, the computer program product comprising a non-transitory computer-readable storage medium having computer-readable program code portions stored therein, the computer-readable program code portions comprising:
a first executable portion for initiating a write-protect state within at least one of the plurality of redundant storage systems, wherein:
an available plurality of categories, including at least one write-protect exclusion category, is configured within a management interface, such that during the disaster recovery testing a storage volume categorized in the at least one write-protect exclusion category is excluded from write protection.

15. The computer program product of claim 14, further including a second executable portion for, if another storage volume is categorized in at least one scratch category previously defined in the available plurality of categories, viewing the another storage volume as private, and ignoring at least one scratch property of the another storage volume during the disaster recovery testing.

16. The computer program product of claim 15, further including a third executable portion for, pursuant to ignoring the at least one scratch property, ignoring a scratch mount shortcut path.

17. The computer program product of claim 14, further including a second executable portion for designating the at least one write-protect exclusion category with a multiple bit hexadecimal value.

18. The computer program product of claim 14, further including a second executable portion for, pursuant to excluding the at least one storage volume from write-protection during the disaster recovery testing, allowing at least one of a read operation, write operation, update operation, and property modification to be performed by a disaster recovery host.

19. The computer program product of claim 15, further including a third executable portion for, pursuant to ignoring the at least one scratch property of the another storage volume, allowing full read access concurrently with non-execution of at least one of a background hold or deletion processing against the another storage volume.

20. The computer program product of claim 14, further including a second executable portion for gathering information for the at least one write-protect exclusion category from a user.

* * * * *